(12) United States Patent
Sommer et al.

(10) Patent No.: US 9,057,003 B2
(45) Date of Patent: Jun. 16, 2015

(54) PROCESS FOR THE PREPARATION OF LOW-VISCOSITY, WATER-EMULSIFIABLE ALLOPHANATES WITH RADIATION-CURABLE GROUPS

(71) Applicant: Allnex IP S.a.r.l., Luxembourg (LU)

(72) Inventors: Stefan Sommer, Leverkusen (DE); Michael Ludewig, Odenthal (DE); Wolfgang Fischer, Meerbusch (DE); Jan Weikard, Leverkusen (DE); Jürgen Lippemeier, Köln (DE)

(73) Assignee: ALLNEX IP S.a.r.L., Luxembourg (LU)

( * ) Notice: Subject to any disclaimer, the term of this patent is extended or adjusted under 35 U.S.C. 154(b) by 262 days.

(21) Appl. No.: 13/651,573

(22) Filed: Oct. 15, 2012

(65) Prior Publication Data

US 2013/0096255 A1    Apr. 18, 2013

(30) Foreign Application Priority Data

Oct. 14, 2011 (EP) .................................. 11185177

(51) Int. Cl.
| | | |
|---|---|---|
| *C08G 18/83* | (2006.01) | |
| *C09D 175/16* | (2006.01) | |
| *C08G 18/48* | (2006.01) | |
| *C08G 18/67* | (2006.01) | |
| *C08G 18/08* | (2006.01) | |
| *C08G 18/10* | (2006.01) | |
| *C08G 18/34* | (2006.01) | |

(52) U.S. Cl.
CPC .......... *C09D 175/16* (2013.01); *C08G 18/4833* (2013.01); *C08G 18/672* (2013.01); *C08G 18/673* (2013.01); *C08G 18/0823* (2013.01); *C08G 18/0828* (2013.01); *C08G 18/10* (2013.01); *C08G 18/348* (2013.01)

(58) Field of Classification Search
CPC .............................. C08G 18/83; C09D 175/16
USPC ........................................... 524/590; 525/450
See application file for complete search history.

(56) References Cited

U.S. PATENT DOCUMENTS

| | | | |
|---|---|---|---|
| 5,596,065 A | | 1/1997 | Gerlitz et al. |
| 5,739,251 A | * | 4/1998 | Venham et al. ................. 528/49 |
| 5,914,383 A | | 6/1999 | Richter et al. |
| 6,150,476 A | * | 11/2000 | Dvorchak et al. ............. 525/455 |
| 6,617,413 B1 | | 9/2003 | Bruchmann et al. |
| 2004/0068081 A1 | | 4/2004 | Facke et al. |
| 2005/0209427 A1 | | 9/2005 | Detrembleur et al. |
| 2006/0079660 A1 | | 4/2006 | Ludewig et al. |
| 2008/0280139 A1 | | 11/2008 | Wagner et al. |
| 2009/0137750 A1 | | 5/2009 | Ludewig et al. |

FOREIGN PATENT DOCUMENTS

| | | |
|---|---|---|
| EP | 0694531 B1 | 9/1998 |
| EP | 0867457 B1 | 3/2003 |
| EP | 0798299 B1 | 8/2003 |
| EP | 2031005 B1 | 1/2011 |
| EP | 1645582 B1 | 8/2011 |
| WO | WO-00/39183 A1 | 7/2000 |
| WO | WO-2004/033522 A1 | 4/2004 |
| WO | WO-2005/092942 A1 | 10/2005 |
| WO | WO-2007/063025 A1 | 6/2007 |

* cited by examiner

*Primary Examiner* — Michael M Bernshteyn
(74) *Attorney, Agent, or Firm* — Drinker Biddle & Reath LLP

(57) ABSTRACT

The present invention relates to a process for the preparation of low-viscosity polyisocyanate reaction products which contain allophanate groups, can be readily emulsified in water and contain activated groups which react, by polymerization, with ethylenically unsaturated compounds under the action of actinic radiation. The present invention furthermore relates to the products which can be prepared by the process according to the invention and their use.

10 Claims, No Drawings

PROCESS FOR THE PREPARATION OF LOW-VISCOSITY, WATER-EMULSIFIABLE ALLOPHANATES WITH RADIATION-CURABLE GROUPS

CROSS-REFERENCE TO RELATED APPLICATIONS

This application claims benefit under 35 U.S.C. §§119 (a)-(d) of European Patent Application No. 11185177.0, filed Oct. 14, 2011.

BACKGROUND OF THE INVENTION

The present invention relates to a process for the preparation of low-viscosity polyisocyanate reaction products which contain allophanate groups, can be readily emulsified in water and contain activated groups which react, by polymerization, with ethylenically unsaturated compounds under the action of actinic radiation. The present invention furthermore relates to the products which can be prepared by the process according to the invention and their use.

The curing of coating systems carrying activated double bonds by actinic radiation is known and is established in industry. Actinic radiation is understood as meaning electromagnetic, ionizing radiation, in particular electron beams, UV rays and visible light (Roche Lexikon Medizin, 4th edition; Urban & Fischer Verlag, Munich 1999). It is one of the fastest methods of curing in coating technology. Coating compositions based on this principle are therefore called radiation- or actinic-curing or -curable systems.

Due to the ecological and economic requirements of modern lacquer systems of using as little organic solvent as possible or even no organic solvent to adjust the viscosity, there is the desire on the one hand to use lacquer raw materials which are already low-viscosity and on the other hand moreover to be able to carry out necessary viscosity adjustments with water as the solvent.

Particularly low-viscosity, radiation-curing binders are, as is known, urethane acrylates containing allophanate groups. These can be prepared by various processes, thus e.g. by direct reaction with an excess of diisocyanate and subsequent distillation of the excess diisocyanate (EP-A 0 867 457 or WO-A 00/39183), by opening of an oxadiazinetrione (WO-A 2004/033522), by opening of a uretdione (WO-A 2005/092942) or also by direct allophanation of an equimolar ratio of isocyanate groups to urethane groups (EP-A 1 645 582). Only the application mentioned last also discloses the possibility of arriving at water-emulsifiable binders via a hydrophilization. Nevertheless, the products obtained in this way are not particularly stable in the emulsion and a phase separation already occurs after a short time.

Urethane acrylates which contain allophanate groups and are water-emulsifiable due to incorporated hydrophilizing agents have also already been disclosed. EP-A 0 694 531 thus describes a method for the preparation of such binders. Nevertheless, a minimizing of the viscosity is relinquished here by the choice of an ionic hydrophilization. Furthermore, it is a complicated multi-stage process, which must be carried out at very high temperatures of more than 100° C., which is detrimental to the stability of systems with activated double bonds. Finally, the process is not aimed at low-viscosity 100% systems, and finished emulsions are already obtained.

WO-A 2007/063025 likewise describes a water-emulsifiable urethane acrylate containing allophanate groups. Nevertheless, these allophanate structures are not produced in the process disclosed, but are incorporated via a modified isocyanate. Such modified isocyanates can be prepared only with difficulty and expense, since the process described in WO-A 00/39183 comprises a distillation process which can be transferred to industry only with difficulty. In the end, isolation of an intermediate product is thus necessary.

It was therefore the object of the present invention to provide a simple process for the preparation of a radiation-curable polyurethane (meth)acrylate which, on the basis of allophanate structures, is of particularly low viscosity as an undiluted system with a solids content of 100 wt. % and can be emulsified readily by stirring into water. Furthermore, the water-diluted radiation-curable polyurethane dispersion should be storage-stable.

EMBODIMENTS OF THE INVENTION

An embodiment of the present invention is a process for preparing a water-emulsifiable, radiation-curing allophanate having residual monomer contents of less than 0.5 weight % and an NCO content of less than 1 weight %, comprising forming urethanes which contain NCO groups and have radiation-curing groups from
  A) at least one compound containing isocyanate groups,
    B) at least one hydroxy-functional compound which has groups which react, by polymerization, with ethylenically unsaturated compounds under the action of actinic radiation (radiation-curing groups),
    C) at least one polyoxyalkylene mono-ol,
    E) optionally in the presence of a catalyst, and
    subsequently reacting said urethanes which contain NCO groups and have radiation-curing groups, without further addition of compounds containing isocyanate groups, in the presence of
    F) an allophanation catalyst, and
    G) optionally a tertiary amine,
wherein the ratio of NCO groups of the compounds from A) to the OH groups of the compounds from B) and C) is 1.80:1.0 to 1.46:1.0.

Another embodiment of the present invention is the above process, wherein at least one compound which differs from B) and/or C) and has NCO-reactive groups is employed as component D), wherein the ratio of NCO groups of the compounds from A) to the OH groups of the compounds from B), C) and D) is 1.80:1.0 to 1.46:1.0.

Another embodiment of the present invention is the above process, wherein hexamethylene-diisocyanate (HDI), isophorone-diisocyanate (IPDI), and/or 4,4'-diisocyanatodicyclohexylmethane are employed in component A).

Another embodiment of the present invention is the above process, wherein the ratio of NCO groups of the compounds from A) to the OH groups of the compounds from B), C) and D) is 1.7:1.0 to 1.47:1.0.

Another embodiment of the present invention is the above process, wherein the ratio of NCO groups of the compounds from A) to the OH groups of the compounds from B), C) and D) is 1.65:1.0 to 1.48:1.0.

Another embodiment of the present invention is the above process, wherein polyoxyalkylene mono-ols which contain a content of from 30 to 100 weight % of units which are derived from ethylene oxide are employed in C).

Another embodiment of the present invention is the above process, wherein hydroxyethyl (meth)acrylate and/or hydroxypropyl (meth)acrylate are employed in component B).

Another embodiment of the present invention is the above process, wherein the allophanation is carried out until the end product has an NCO content of less than 0.1 weight %.

Another embodiment of the present invention is the above process, wherein component A) is employed in amounts of from 20 to 60 weight %, component B) in amounts of from 25 to 50 weight %, component C) in amounts of from 10 to 35 weight %, component D) in amounts of from 0 to 40 weight %, component E) in amounts of from 0 to 5 weight %, component F) in amounts of from 0.001 to 5 weight % and component G) in amounts of from 0 to 5 weight %, with the proviso that the sum of the weight % of components A) to G) is 100.

Another embodiment of the present invention is the above process, wherein the urethanation of components A) to D) is optionally carried out in the presence of E), according to determination of the NCO content an NCO value is reached which deviates from the theoretical % NCO content by up to 1.5 weight % NCO (absolute), and the allophanation is subsequently carried out by addition of component E) and optionally F), without further addition of compounds containing isocyanate groups.

Yet another embodiment of the present invention is a radiation-curing, water-emulsifiable allophanate obtainable by the above process.

Yet another embodiment of the present invention is a coating composition comprising
  a) one or more of the above radiation-curing, water-emulsifiable allophanates;
  b) optionally further compounds which differ from a) and contain groups which react, by polymerization, with ethylenically unsaturated compounds under the action of actinic radiation;
  c) optionally further aqueous binders which are not radiation-curable;
  d) initiators;
  e) optionally solvents; and
  f) optionally auxiliary substances and additives.

Yet another embodiment of the present invention is a substrate coated with the above coating composition.

DETAILED DESCRIPTION OF THE INVENTION

Surprisingly, a process for the preparation of water-emulsifiable, radiation-curing allophanates having residual monomer contents of less than 0.5 wt. % and an NCO content of less than 1 wt. % has been found, in which, from
  A) at least one compound containing isocyanate groups,
  B) at least one hydroxy-functional compound which has groups which react, by polymerization, with ethylenically unsaturated compounds under the action of actinic radiation (radiation-curing groups),
  C) at least one polyoxyalkylene mono-ol,
  D) optionally at least one compound which differs from B) and/or C and has NCO-reactive groups,
  E) optionally in the presence of a catalyst,
  urethanes which contain NCO groups and have radiation-curing groups are formed, which are subsequently reacted, without further addition of compounds containing isocyanate groups, in the presence of
  F) an allophanation catalyst and
  G) optionally a tertiary amine,
wherein the ratio of NCO groups of the compounds from A) to the OH groups of the compounds from B) and C) and optionally D) is 1.80:1.0 to 1.46:1.0, preferably 1.70:1.0 to 1.47:1.0, particularly preferably 1.65:1.0 to 1.48:1.0 and very particularly preferably 1.60:1.0 to 1.50:1.0.

The term "water-emulsifiable" in the context of the invention means that the polyurethanes according to the invention can be mixed with water and an emulsion thereby forms over a wide range of mixing ratios. The solids content of 100 wt. % means that the polyurethane system has not been diluted with water.

The invention also provides water-emulsifiable urethane (meth)acrylates obtainable by the process according to the invention.

The invention also provides the use of the water-emulsifiable urethane (meth)acrylates obtainable by the process according to the invention for the preparation of coatings and lacquers as well as adhesives, printing inks, casting resins, dental compositions, sizes, photoresists, stereolithography systems, resins for composite materials and sealing compositions.

In the context of this invention, "(meth)acrylate" relates to corresponding acrylate or methacrylate functions or to a mixture of the two.

Possible isocyanate-containing compounds A) are aromatic, aliphatic and cycloaliphatic polyisocyanates. Suitable polyisocyanates are compounds of the formula $Q(NCO)_n$ having an average molecular weight of less than 800, wherein n denotes a number from 2 to 4 and Q denotes an aromatic $C_6$-$C_{15}$-hydrocarbon radical, an aliphatic $C_4$-$C_{12}$-hydrocarbon radical or a cycloaliphatic $C_6$-$C_{15}$-hydrocarbon radical, for example diisocyanates from the series 2,4-/2,6-toluene-diisocyanate (TDI), methylenediphenyl-diisocyanate (MDI), triisocyanatononane (TIN), naphthyl-diisocyanate (NDI), 4,4'-diisocyanatodicyclohexylmethane, 3-isocyanatomethyl-3,3,5-trimethylcyclohexyl-isocyanate (isophorone-diisocyanate=IPDI), tetramethylene-diisocyanate, hexamethylene-diisocyanate (HDI), 2-methylpentamethylene-diisocyanate, 2,2,4-trimethylhexamethylene-diisocyanate (THDI), dodecamethylene-diisocyanate, 1,4-diisocyanato-cyclohexane, 4,4'-diisocyanato-3,3'-dimethyldicyclohexyl-methane, 4,4'-diisocyanatodicyclohexyl-2,2-propane, 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α', α'-tetramethyl-m- or -p-xylylene-diisocyanate (TMXDI) and mixtures comprising these compounds.

Reaction products of the abovementioned isocyanates with themselves or with one another to give polyisocyanates with a uretdione, isocyanurate, allophanate, biuret, iminooxadiazinedione and/or oxadiazinetrione structure, such as are described, for example, in J. Prakt. Chem. 336 (1994) 185-200 and EP-A 0 798 299 by way of example are likewise suitable as isocyanate-containing compounds A).

Reaction products of the abovementioned isocyanates with other isocyanate-reactive compounds to give prepolymers are furthermore suitable as isocyanate-containing compounds A). Such isocyanate-reactive compounds are, above all, polyols, such as e.g. polyether polyols, polyester polyols, polycarbonate polyols and polyfunctional alcohols. Higher molecular weight and, in a lesser amount, also low molecular weight hydroxy compounds can be employed as polyols.

The compounds of component A) can accordingly be employed directly in the process according to the invention, or are prepared by a preliminary reaction starting from any desired precursor before the process according to the invention is carried out.

The use of monomeric diisocyanates is preferred as component A). The use of hexamethylene-diisocyanate (HDI), isophorone-diisocyanate (IPDI) and/or 4,4'-diisocyanatodicyclohexylmethane is particularly preferred. The use of hexamethylene-diisocyanate is very particularly preferred.

Actinic radiation is understood as meaning electromagnetic, ionizing radiation, in particular electron beams, UV rays and visible light (Roche Lexikon Medizin, 4th edition; Urban & Fischer Verlag, Munich 1999).

In the context of the present invention, groups which react, by polymerization, with ethylenically unsaturated compounds under the action of actinic radiation are vinyl ether, maleyl, fumaryl, maleimide, dicyclopentadienyl, acrylamide, acrylic and methacrylic groups, these preferably being vinyl ether, acrylate and/or methacrylate groups and particularly preferably acrylate groups.

Examples of suitable compounds of component B) containing hydroxyl groups are 2-hydroxyethyl (meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono (meth)acrylate (e.g. PEM63P, Laporte Performance Chemicals Ltd., UK), poly(ε-caprolactone)mono(meth)acrylates, such as e.g. Tone M100® (Dow, Schwalbach, DE), 2-hydroxypropyl(meth)acrylate, 4-hydroxybutyl(meth)acrylate, hydroxybutyl vinyl ether, 3-hydroxy-2,2-dimethylpropyl (meth)acrylate, the hydroxy-functional mono-, di- or, where possible, higher acrylates, such as e.g. glycerol di(meth)acrylate, trimethylolpropane di(meth)acrylate, pentaerythritol tri (meth)acrylate or dipentaerythritol penta(meth)acrylate, which are accessible by reaction of polyfunctional optionally alkoxylated alcohols, such as trimethylolpropane, glycerol, pentaerythritol, dipentaerythritol.

Alcohols which are obtained from the reaction of acids containing double bonds with epoxide compounds which optionally contain double bonds are also likewise suitable as a constituent of B), thus e.g. the reaction products of (meth) acrylic acid with glycidyl (meth)acrylate or bisphenol A diglycidyl ether.

Unsaturated alcohols which are obtained from the reaction of optionally unsaturated acid anhydrides with hydroxy and epoxide compounds optionally containing acrylate groups can moreover likewise be employed. These are, for example, the reaction products of maleic anhydride with 2-hydroxyethyl (meth)acrylate and glycidyl (meth)acrylate.

The compounds of component B) particularly preferably correspond to the abovementioned type and have an OH-functionality of from 0.9 to 1.1.

The use of hydroxyethyl (meth)acrylate, hydroxypropyl (meth)acrylate and/or hydroxybutyl (meth)acrylate is preferred. Hydroxyethyl acrylate and/or hydroxypropyl acrylate are very particularly preferred.

Polyoxyalkylene mono-ols C) are employed according to the invention as compounds having a nonionically hydrophilizing action. These polyoxyalkylene mono-ols contain a content of from 30 wt. % to 100 wt. % of units which are derived from ethylene oxide. Preferably, polyoxyalkylene mono-ols containing, as a statistical average, 5 to 70, preferably 7 to 55 ethylene oxide units per molecule, such as are accessible in a manner known per se by alkoxylation of suitable starter molecules (e.g. in Ullmanns Encyclopädie der technischen Chemie, 4th edition, volume 19, Verlag Chemie, Weinheim p. 31-38), are employed.

Suitable starter molecules for the preparation of these polyoxyalkylene ether mono-ols are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Preferred starter molecules are saturated monoalcohols, and particularly preferred starter molecules are methanol or ethanol.

Alkylene oxides which are suitable for the alkoxylation reaction are, for example, ethylene oxide, 1-butene oxide and/or propylene oxide, preferably ethylene oxide and/or propylene oxide, which can be employed in the alkoxylation reaction in any desired sequence or also in a mixture.

The polyoxyalkylene mono-ols are either pure polyethylene oxide polyether mono-ols or mixed polyalkylene oxide polyether mono-ols, the alkylene oxide units of which comprise ethylene oxide units to the extent of at least 30 mol %, preferably to the extent of at least 50 mol %. The use of pure polyethylene oxide polyether mono-ols is particularly preferred.

In addition to the OH-functional unsaturated compounds of component B) and the polyoxyalkylene mono-ols C), further compounds D) which differ from those from B) and/or C) and have NCO-reactive groups, such as, for example, OH, SH or NH, can also be employed in the process according to the invention.

These can be, for example, NH- or SH-functional compounds with groups which react, by polymerization, with ethylenically unsaturated compounds under the action of actinic radiation.

Compounds which are non-reactive under the action of actinic radiation, such as e.g. polyether polyols, polyester polyols, polycarbonate polyols and mono- or polyfunctional alcohols, can also be co-used as component D) to influence the product properties. Low molecular weight and, in a lesser amount, also higher molecular weight hydroxy compounds can be employed as polyols.

The conventional polyols in polyurethane chemistry having molecular weights of from 62 to 399 can be used as low molecular weight polyols which can be co-used as component D), such as ethylene glycol, triethylene glycol, tetraethylene glycol, propane-1,2-diol and -1,3-diol, butane-1,4-diol and -1,3-diol, hexane-1,6-diol, octane-1,8-diol, neopentyl glycol, 1,4-bis(hydroxymethyl)cyclohexane, bis(hydroxymethyl)tricyclo[5.2.1.0$^{2.6}$]decane or 1,4-bis(2-hydroxyethoxy) benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol, butane-1,2,4-triol, pentaerythritol, quinitol, mannitol, sorbitol, methyl glycoside and 4,3,6-dianhydrohexitols.

Low molecular weight monohydroxy compounds can also be employed as component D), and there may be mentioned by way of example saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol.

Higher molecular weight hydroxy compounds as component D) include the conventional hydroxy-polyesters, hydroxy-polyethers, hydroxy-polythioethers, hydroxy-polyacetals, hydroxy-polycarbonates, dimer fatty alcohols and/or ester-amides in polyurethane chemistry, in each case having average molecular weights of from 400 to 8,000 g/mol, preferably those having average molecular weights of from 500 to 2,000 g/mol. However, the co-use of such higher molecular weight hydroxy compounds is not preferred.

Possible compounds of the optional catalyst component E) are urethanation catalysts known per se to the person skilled in the art, such as organotin compounds or aminic catalysts. Organotin compounds which may be mentioned by way of example are: dibutyltin diacetate, dibutyltin dilaurate, dibutyltin bis-acetoacetonate and tin carboxylates, such as, for example, tin octoate. The tin catalysts mentioned can optionally be used in combination with aminic catalysts, such as aminosilanes or 1,4-diazabicyclo[2.2.2]octane. The use of Lewis acid metal compounds which contain molybdenum, vanadium, zirconium, caesium, bismuth or tungsten is likewise conceivable.

Dibutyltin dilaurate is preferably employed as the urethanation catalyst in E).

In the process according to the invention, the catalyst component E) is co-used, if at all, in amounts of 0.001-5.0 wt. %, preferably 0.001-0.1 wt. % and particularly preferably 0.005-0.05 wt. %, based on the solids content of the process product.

Allophanation catalysts known per se to the person skilled in the art can be used as catalyst F), such as, for example, the zinc salts zinc octoate, zinc acetylacetonate and zinc 2-ethylcaproate, zirconium octoate, bismuth octoate, tin octoate or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. The use of metal octoates is preferred, and the use of zinc octoate is particularly preferred.

In the context of this invention, the term "zinc octoate" is also understood as meaning technical grade isomer product mixtures, which can also contain contents of zinc salts of $C_6$-$C_{19}$-fatty acids in addition to various isomeric octoates. A corresponding meaning also applies to other metal octoates.

The allophanation catalyst F) is employed in amounts of 0.001-5.0 wt. %, preferably 0.001-0.1 wt. % and particularly preferably 0.005-0.05 wt. %, based on the solids content of the process product.

In principle, the allophanation catalyst F) can already be used for the urethanation reaction in E) and the two-stage procedure can be simplified to a one-stage reaction. However, this is not preferred, so that the allophanation catalyst is only added when all or a proportion of the urethane groups are to be reacted to give allophanate groups.

The catalyst F) can be added all at once in one portion, in portions or also continuously. The addition all at once is preferred.

If the preferred zinc octoate is used as the allophanation catalyst F), the allophanation reaction according to the teaching of EP-A 2 031 005 can proceed very slowly and often incompletely, so that in this case it is preferable to employ a tertiary amine as component G). Suitable tertiary amines G) preferably have at least nine carbon atoms, it being possible for them to contain both aromatic and aliphatic radicals, which can also be bridged to one another. The amines preferably contain no further functional groups. Examples of suitable compounds are N,N,N-benzyldimethylamine, N,N,N-dibenzylmethylamine, N,N,N-cyclohexyldimethylamine, N-methylmorpholine, N,N,N-tribenzylamine, N,N,N-tripropylamine, N,N,N-tributylamine, N,N,N-tripentylamine or N,N,N-trihexylamine In this context, the use of N,N,N-benzyldimethylamine is preferred.

The tertiary amine, if co-used, is employed in amounts of 0.01-5.0 wt. %, preferably 0.01-0.1 wt. % and particularly preferably 0.05-0.5 wt. %, based on the solids content of the process product.

The allophanation reaction is preferably carried out until the NCO content of the end product is less than 0.5 wt. %, particularly preferably less than 0.1 wt. %.

It is in principle possible to react a residual content of NCO groups with NCO-reactive compounds, such as e.g. alcohols, when the allophanation reaction has ended. Products with very particularly low NCO contents are thereby obtained.

It is also possible to apply the catalysts E) and/or F) to support materials by methods known to the person skilled in the art and to use them as heterogeneous catalysts.

Solvents or reactive diluents can optionally be employed at any desired point in the process according to the invention.

Component A) is employed in amounts of from 20 to 60 wt. %, preferably from 30 to 50 wt. %, particularly preferably 35 to 45 wt. %, component B) in amounts of from 25 to 50 wt. %, preferably from 30 to 45 wt. %, particularly preferably from 35 to 40 wt. %, component C) in amounts of from 10 to 35 wt. %, preferably from 15 to 25 wt. %, particularly preferably from 19 to 25 wt. %, component D) in amounts of from 0 to 40 wt. %, preferably from 0 to 15 wt. %, very particularly preferably from 0 to 5 wt. %, component E) in amounts of from 0 to 5 wt. %, preferably from 0.001 to 0.1 wt. %, particularly preferably from 0.005 to 0.05 wt. %, component F) in amounts of from 0.001 to 5 wt. %, preferably from 0.001 to 0.1 wt. %, very particularly preferably from 0.005 to 0.05 wt. % and component G) in amounts of from 0 to 5 wt. %, preferably from 0.01 to 1 wt. %, very particularly preferably from 0.05 to 0.5 wt. %, with the proviso that the sum of the wt. % of components A) to G) is 100.

Suitable solvents are inert towards the functional groups present in the process product from the point in time of addition to the end of the process. Solvents used in lacquer technology e.g. are suitable, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide, dimethylformamide, preferably, however, no solvent being added.

Compounds which likewise (co)polymerize during the UV curing and are thus co-incorporated into the polymer network and which are inert towards NCO groups can be co-used as reactive diluents. Such reactive diluents are described by way of example in P. K. T. Oldring (ed.), Chemistry & Technology of UV & EB Formulations For Coatings, Inks & Paints, vol. 2, 1991, SITA Technology, London, p. 237-285. These can be esters of acrylic acid or methacrylic acid, preferably of acrylic acid, with mono- or polyfunctional alcohols. Suitable alcohols are, for example, the isomeric butanols, pentanols, hexanols, heptanols, octanols, nonanols and decanols, and furthermore cycloaliphatic alcohols, such as isobornol, cyclohexanol and alkylated cyclohexanols, dicyclopentanol, arylaliphatic alcohols, such as phenoxyethanol and nonylphenylethanol, and tetrahydrofurfuryl alcohols. Alkoxylated derivatives of these alcohols can furthermore be used. Suitable difunctional alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or also alkoxylated derivatives of these alcohols. Preferred difunctional alcohols are hexane-1,6-diol, dipropylene glycol and tripropylene glycol. Suitable trifunctional alcohols are glycerol or trimethylolpropane or alkoxylated derivatives thereof Tetrafunctional alcohols are pentaerythritol or alkoxylated derivatives thereof. However, the co-use of reactive diluents is not preferred.

The process according to the invention is carried out at temperatures of at most 100° C., preferably 20 to 100° C., particularly preferably from 40 to 100° C., in particular at 60 to 90° C.

The binders according to the invention can be stabilized against premature polymerization. Stabilizers which inhibit the polymerization are therefore preferably added as a constituent of one or more components (A), B), C), D), E) or F)) before and/or during the reaction. Examples of suitable stabilizers are e.g. phenothiazine and phenols, such as para-methoxyphenol, 2,5-di-tert-butylhydroquinone or 2,6-di-tert-butyl-4-methylphenol. N-Oxy compounds are also suitable for the stabilization, such as e.g. 2,2,6,6-tetramethylpiperidine N-oxide (TEMPO) or its derivatives. The stabilizers can likewise also be co-incorporated chemically into the binder, and in this context compounds of the abovementioned classes are suitable in particular if they also carry further free aliphatic alcohol groups or primary or secondary amine groups and therefore can be bonded chemically to compounds of component A) via urethane or urea groups. 2,2,6,6-Tetramethyl-4-hydroxypiperidine N-oxide is particularly suitable for this.

Other stabilizers, such as e.g. compounds of the HALS (HALS=hindered amine light stabilizers) class can likewise be used, but are not preferred.

An oxygen-containing gas, preferably air, can be passed into and/or over the reaction mixture to stabilize the reaction mixture, in particular the unsaturated groups against premature polymerization. It is preferable for the gas to have the lowest possible content of moisture, in order to prevent undesirable reaction in the presence of isocyanate.

A stabilizer can be added during the preparation of the binders according to the invention, and in order to achieve a long-term stability after-stabilizing can be finally carried out again with a phenolic stabilizer, and the reaction product can be optionally saturated with air.

In the process according to the invention, it is preferable to employ the stabilizer component in amounts of 0.001-5.0 wt. %, preferably 0.01-2.0 wt. % and particularly preferably 0.05-1.0 wt. %, based on the solids content of the process product.

The process according to the invention is preferably carried out in a stirred reactor.

The course of the reaction can be monitored by suitable measuring equipment installed in the reaction vessel and/or with the aid of analyses on samples taken. Suitable methods are known to the person skilled in the art. They are, for example, viscosity measurements, measurements of the NCO content, measurement of the refractive index, measurement of the OH content, gas chromatography (GC), nuclear magnetic resonance spectroscopy (NMR), infra-red spectroscopy (IR) and near infra-red spectroscopy (NIR). IR spectroscopy for monitoring of the free NCO groups present (for aliphatic NCO groups the band in the IR spectrum is at approx. $\upsilon=2272$ cm$^{-1}$) and GC analyses for unreacted compounds from A), B), C) and optionally D) are preferred.

In a preferred embodiment, the urethanation of components A) to D) is optionally carried out in the presence of E). According to determination of the NCO content, an NCO value is reached which may deviate from the theoretical % NCO content by up to 1.5 wt. % NCO (absolute), preferably by up to 1.0 wt. % (absolute), particularly preferably by up to 0.7 wt. % (absolute), and the allophanation is subsequently carried out by addition of component E) and optionally F), without further addition of compounds containing isocyanate groups.

It is possible in principle to carry out the process according to the invention in one stage, wherein a catalyst or a catalyst mixture which catalyses both the urethanation and the allophanation reaction is used. In this context, urethanation and allophanation are carried out in parallel. However, this procedure is not preferred.

The unsaturated allophanates obtainable by the process according to the invention, in particular those based on the hexamethylene-diisocyanate preferably employed, preferably have shear viscosities at 23° C. of <150,000 mPas, particularly preferably <80,000 mPas and very particularly preferably <50,000 mPas at a solids content of 100%. The viscosity is determined with a cone-plate rotary viscometer, MCR 51 from Anton Paar, DE, with a shear rate of 50 s$^{-1}$ in accordance with ISO/DIS 3219:1990.

The radiation-curing, water-emulsifiable allophanates according to the invention can be used for the preparation of coatings and lacquers as well as adhesives, printing inks, casting resins, dental compositions, sizes, photoresists, stereolithography systems, resins for composite materials and sealing compositions. In the case of gluing or sealing, nevertheless, it is a prerequisite that during curing by radiation at least one of the two substrates to be glued or to be sealed with one another must be permeable, i.e. as a rule transparent, to the radiation used for the curing. If an electron beam is used for the curing, an adequate permeability to electrons must be ensured. The use of the allophanates according to the invention as binders in lacquers and coatings is preferred.

The invention also provides coating compositions comprising
a) one or more of the radiation-curing, water-emulsifiable allophanates according to the invention,
b) optionally further compounds which differ from a) and contain groups which react, by polymerization, with ethylenically unsaturated compounds under the action of actinic radiation,
c) optionally further aqueous binders which are not radiation-curable,
d) initiators,
e) optionally solvents and
f) optionally auxiliary substances and additives.

The compounds of component b) include non-aqueous compounds, such as, in particular, urethane (meth)acrylates, preferably based on hexamethylene-diisocyanate, 1-isocyanato-3,3,5-trimethyl-5-isocyanatomethylcyclohexane, 4,4'-diisocyanatodicyclohexylmethane and/or trimethylhexamethylene-diisocyanate, which can optionally be modified with isocyanurate, allophanate, biuret, uretdione and/or iminooxadiazinetrione groups, and which contain no groups which are reactive towards isocyanate groups.

The reactive diluents already described which are known in the art of radiation-curing coatings can furthermore be used as a constituent of b) if they contain no groups which are reactive with NCO groups.

The compounds of component b) also include compounds dissolved or dispersed in water, such as, in particular, dispersions which contain unsaturated, radiation-curable groups, such as e.g. dispersions which contain unsaturated, radiation-curable groups and are based on polyester, polyurethane, polyepoxy(meth)acrylate, polyether, polyamide, polysiloxane, polycarbonate, polyepoxyacrylate, polyester acrylate, polyurethane polyacrylate and/or polyacrylate. In this context, the unsaturated, radiation-curable groups can be present bonded to one of the polymers mentioned and/or present in the form of radiation-curable monomers, so-called reactive diluents, in dispersion alongside the polymers mentioned.

The compounds of component c) include compounds dissolved or dispersed in water, such as, in particular, dispersions which contain no unsaturated, radiation-curable groups, such as e.g. dispersions based on polyester, polyurethane, polyether, polyamide, polysiloxane, polycarbonate, polyurethane polyacrylate and/or polyacrylate.

In particular, if components b) and c) are compounds dissolved or dispersed in water, such as, in particular, dispersions, the addition of the water-emulsifiable, radiation-curable allophanates a) according to the invention is advantageous, since the solids content of components b) and c) can be increased in this manner without a substantial increase in the resulting viscosity.

Initiators which can be activated by radiation and/or thermally can be employed as initiators of component d) for a free radical polymerization. Photoinitiators which are activated by UV or visible light are preferred here. A distinction is made in principle between two types of photoinitiators, the unimolecular (type I) and the bimolecular (type II). Suitable (type I) systems are aromatic ketone compounds, such as e.g. benzophenones in combination with tertiary amines, alkylbenzophenones, 4,4'-bis(dimethylamino)benzophenone (Michler's ketone), anthrone and halogenated benzophenones or mixtures of the types mentioned. (Type II) initiators, such as benzoin and its derivatives, benzil ketals, acylphosphine oxides, e.g. 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable.

The initiators, which are employed in amounts of between 0.1 and 10 wt. %, preferably 0.1 to 5 wt. %, based on the weight of the lacquer binder, can be used as the individual substance or, because of frequent advantageous synergistic effects, also in combination with one another.

If electron beams are used instead of UV radiation, no photoinitiator is required. Electron radiation, as is known to the person skilled in the art, is generated by means of thermal emission and accelerated via a potential difference. The high-energy electrons then break through a titanium film and are deflected to the coating composition to be cured. The general principles of electron beam curing are described in detail in "Chemistry & Technology of UV & EB Formulations for Coatings, Inks & Paints", vol. 1, P. K. T. Oldring (ed.), SITA Technology, London, England, p. 101-157, 1991.

In the case of thermal curing of the activated double bonds, this can also be carried out with addition of thermally dissociating agents which form free radicals. As is known to the person skilled in the art, suitable agents are e.g. peroxy compounds, such as dialkoxy dicarbonates, such as e.g. bis(4-tert-butylcyclohexyl)peroxydicarbonate, dialkyl peroxides, such as e.g. dilauryl peroxide, peresters of aromatic or aliphatic acids, such as e.g. tert-butyl perbenzoate or tert-amyl peroxy-2-ethylhexanoate, inorganic peroxides, such as e.g. ammonium peroxodisulfate, potassium peroxodisulfate, organic peroxides, such as e.g. 2,2-bis(tert-butylperoxy)butane, dicumyl peroxide, tert-butyl hydroperoxide, or also azo compounds, such as 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide), 2,2'-azobis{2-methyl-N-[2-(1-hydroxybutyl)]-propionamide}, 2,2'-azobis{2-methyl-N-[2-(1-hydroxybutyl)]propionamide, 2,2'-azobis{2-methyl-N-[1,1-bis(hydroxymethyl)-2-hydroxyethyl]propionamide. Highly substituted 1,2-diphenylethanes (benzopinacols), such as e.g. 3,4-dimethyl-3,4-diphenylhexane, 1,1,2,2-tetraphenylethane-1,2-diol or also silylated derivatives thereof, are also possible.

It is also possible to use a combination of photoinitiators and initiators which can be activated thermally.

Organic solvents which are known per se to the person skilled in the art can also optionally be co-used as component e). However, it is preferable to employ water as the sole diluent.

The composition can also contain UV absorbers and/or HALS stabilizers as auxiliary substances and additives (component f)) to increase the stability of the cured lacquer layer to weathering. A combination of UV absorber and HALS stabilizers is preferred. The former advantageously have an absorption range of not more than 390 nm, for example UV absorbers such as triphenyltriazine types (e.g. Tinuvin® 400 (Ciba Spezialitätenchemie GmbH, Lampertheim, DE)), benzotriazoles (e.g. Tinuvin® 622 (Ciba Spezialitätenchemie GmbH, Lampertheim, DE)) or oxalic acid dianilides (e.g. Sanduvor® 3206 (Clariant, Muttenz, CH)), and are added in amounts of 0.5-3.5 wt. %, based on the solid resin. Suitable HALS stabilizers are obtainable commercially (Tinuvin® 292 or Tinuvin® 123 (Ciba Spezialitätenchemie GmbH, Lampertheim, DE) or Sanduvor® 3258 (Clariant, Muttenz, CH)). Preferred amounts are 0.5-2.5 wt. %, based on the solid resin.

Likewise, f) can contain further auxiliary substances and additives known in lacquer technology, such as e.g. pigments, including metallic effect pigments, dyestuffs, matting agents, fillers, flow, wetting and deaeration additives, slip additives, nanoparticles, anti-yellowing additives, thickeners and additives for reduction of the surface tension.

The application of the coating compositions according to the invention to the material to be coated is carried out using the conventional and known methods in coating technology, such as spraying, knife-coating, rolling, pouring, dipping, whirler-coating, brushing or misting or by printing techniques, such as screen, gravure, flexographic or offset printing, and by transfer methods.

Suitable substrates are, for example, wood, metal, in particular also metal such as is used in the uses of so-called wire, coil, can or container lacquering, and furthermore plastic, also in the form of films, in particular ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PU, PVC, RF, SAN, PBT, PPE, POM, PU-RIM, SMC, BMC, PP-EPDM and UP (abbreviations according to DIN 7728 Part 1), paper, leather, textiles, felt, glass, wood, wood materials, cork, inorganically bonded substrates, such as wood and fibre cement boards, electronic assemblies or mineral substrates. Substrates which comprise various of the abovementioned materials, or already coated substrates, such as vehicles, aircraft or ships and parts thereof, in particular vehicle bodies or attachments, can also be lacquered. It is also possible to apply the coating compositions only temporarily to a substrate and then to cure them partly or completely and optionally detach them again in order e.g. to produce films.

For curing, e.g. water or, where appropriate, solvents present can be completely or partly removed by allowing to evaporate in air.

During the evaporation in air or thereafter, thermal and/or photochemical curing can be carried out.

If necessary, the thermal curing can be carried out at room temperature, but also at elevated temperature, preferably at 40-160° C., preferably at 60-130° C., particularly preferably at 80-110° C.

If photoinitiators are used in d), the radiation curing is preferably carried out by the action of actinic radiation, for example by irradiation with UV radiation or daylight, e.g. light of wavelength 200 to 700 nm, or by irradiation with high-energy electrons (electron radiation, 150 to 300 keV). High or medium pressure mercury vapour lamps, for example, serve as radiation sources for light or UV radiation, it being possible for the mercury vapour to be modified by doping with other elements, such as gallium or iron. Lasers, pulsed lamps (known by the name UV flash lamps), halogen lamps or excimer lamps are likewise possible. The lamps can be equipped, as a result of their design or by the use of special filters and/or reflectors, such that emission of a part of the UV spectrum is prevented. For example, for industrial hygiene reasons e.g. the radiation assigned to UV-C or UV-C and UV-B can be filtered out. The lamps can be installed in a fixed position, so that the goods to be irradiated are passed by the radiation source by means of a mechanical device, or the lamps can be movable and the goods to be irradiated do not change their position during curing. The radiation dose conventionally sufficient for crosslinking in UV curing is in the range of from 80 to 5,000 mJ/cm$^2$.

The irradiation can optionally also be carried out with exclusion of oxygen, e.g. under an inert gas atmosphere or oxygen-reduced atmosphere. Suitable inert gases are, preferably, nitrogen, carbon dioxide, noble gases or combustion gases. The irradiation can furthermore be carried out by covering the coating with media which are transparent for the radiation. Examples of these are e.g. films of plastic, glass, or liquids, such as water.

The type and concentration of the initiator optionally used are to be varied in a manner known to the person skilled in the art, depending on the radiation dose and curing conditions.

High pressure mercury lamps in installations of fixed position are particularly preferably employed for the curing. Photoinitiators are then employed in concentrations of from 0.1 to 10 wt. %, particularly preferably 0.2 to 3.0 wt. %, based on the solids of the coating. For curing these coatings, a dose of from 200 to 3,000 mJ/cm$^2$, measured in the wavelength range of from 200 to 600 nm, is preferably used.

If thermally activatable initiators are used in d), curing is carried out by increasing the temperature. In this context, the thermal energy can be introduced into the coating by radiation, thermal conduction and/or convection, the infra-red lamps, near infra-red lamps and/or ovens customary in coating technology conventionally being employed.

It is preferable to carry out the curing by actinic radiation.

The layer thicknesses applied (before curing) are typically between 0.5 and 5,000 μm, preferably between 5 and 1,000 μm, particularly preferably between 15 and 200 μm. If solvents are used, this is removed by the usual methods after the application and before the curing.

The invention also provides a process for the production of coatings on substrates, characterized in that the coating composition according to the invention is applied to the substrate as described above and is then cured as described above.

The invention also provides substrates coated with the coating compositions according to the invention which contain the water-emulsifiable allophanates prepared by the process according to the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless stated otherwise, all the percentage data relate to per cent by weight.

The NCO content was in each case monitored titrimetrically in accordance with DIN EN ISO 11909.

The viscosity measurements were carried out with a cone-plate rotary viscometer, MCR 51 from Anton Paar, DE, with a shear rate of 50 s$^{-1}$ in accordance with ISO/DIS 3219:1990.

The ambient temperature of 23° C. prevailing at the time the experiments were carried out is called RT.

The OH number was determined in accordance with DIN 53240-2.

The solids content was determined gravimetrically, after all the volatile constituents had been evaporated off, in accordance with DIN EN ISO 3251.

Example 1

(NCO/OH ratio=1.51:1.00)

340 g of hexamethylene-diisocyanate and 100 mg of phenothiazine were initially introduced into a 2,000 ml four-necked glass flask with a reflux condenser, heatable oil bath, mechanical stirrer, line for passing air through (1 l/h), internal thermometer and dropping funnel and were heated to 60° C. 50 mg of dibutyltin dilaurate were added and first 372 g of hydroxypropyl acrylate and then 220 g of methoxypolyethylene glycol of molecular weight 750 g/mol (Pluriol® 750, BASF SE Ludwigshafen, DE) were added dropwise such that the temperature of 80° C. was not exceeded. The mixture was subsequently stirred until the theoretical NCO value of 6.8% was reached. 3.38 g of N,N-dimethylbenzylamine were then added and the mixture was stirred for about 5 minutes until it was homogenized. 4.48 g of zinc octoate (Borchi® Kat 22 from Borchers GmbH, Langenfeld, DE) were then admixed and the mixture was stirred at 80° C. until the NCO content had fallen below 0.2% (about 16 hours). A colourless resin with a viscosity of 18,500 mPas (23° C.) was obtained. The product was readily water-emulsifiable at a solids content of approx. 40%. The emulsion was stable for several days.

Example 2

(NCO/OH ratio=1.51:1.00)

336 g of hexamethylene-diisocyanate and 80 mg of phenothiazine were initially introduced into a 2,000 ml four-necked glass flask with a reflux condenser, heatable oil bath, mechanical stirrer, line for passing air through (1 l/h), internal thermometer and dropping funnel and were heated to 60° C. 40 mg of dibutyltin dilaurate were added, and 297 g of hydroxypropyl acrylate, 121 g of methoxypolyethylene glycol of molecular weight 750 g/mol (Pluriol® 750, BASF SE Ludwigshafen, DE) and then 20.0 g of cyclohexanol were successively added dropwise such that the temperature of 80° C. was not exceeded. The mixture was subsequently stirred until the theoretical NCO value of 7.3% was reached. 2.84 g of N,N-dimethylbenzylamine were then added and the mixture was stirred for about 5 minutes until it was homogenized. 3.76 g of zinc octoate (Borchi® Kat 22 from Borchers GmbH, Langenfeld, DE) were then admixed and the mixture was stirred at 80° C. until the NCO content had fallen below 0.2% (about 16 hours). A colourless resin with a viscosity of 30,000 mPas (23° C.) was obtained. The product was readily water-emulsifiable at a solids content of approx. 40%. The emulsion was stable for several days.

Example 3

(NCO/OH ratio=1.51:1.00)

336 g of hexamethylene-diisocyanate and 80 mg of phenothiazine were initially introduced into a 2,000 ml four-necked glass flask with a reflux condenser, heatable oil bath, mechanical stirrer, line for passing air through (1 l/h), internal thermometer and dropping funnel and were heated to 60° C. 40 mg of dibutyltin dilaurate were added, and 177 g of hydroxyethyl acrylate, 99 g of hydroxypropyl acrylate, 125 g of methoxypolyethylene glycol of molecular weight 750 g/mol (Pluriol® 750, BASF SE Ludwigshafen, DE) and then 20.0 g of cyclohexanol were successively added dropwise such that the temperature of 80° C. was not exceeded. The mixture was subsequently stirred until the theoretical NCO value of 7.5% was reached. 2.84 g of N,N-dimethylbenzylamine were then added and the mixture was stirred for about 5 minutes until it was homogenized. 3.76 g of zinc octoate (Borchi® Kat 22 from Borchers GmbH, Langenfeld, DE) were then admixed and the mixture was stirred at 80° C. until the NCO content had fallen below 0.2% (about 16 hours). A colourless resin with a viscosity of 17,600 mPas (23° C.) was obtained. The product was readily water-emulsifiable at a solids content of approx. 40%. The emulsion was stable for several days.

Example 4 (Comparison)

(NCO/OH ratio=1.42:1.00)

355 g of hexamethylene-diisocyanate and 100 mg of phenothiazine were initially introduced into a 2,000 ml four-necked glass flask with a reflux condenser, heatable oil bath, mechanical stirrer, line for passing air through (1 l/h), internal thermometer and dropping funnel and were heated to 60° C. 50 mg of dibutyltin dilaurate were added, and first 262 g of hydroxypropyl acrylate and then 61 g of hydroxyethyl acrylate and finally 313 g of methoxypolyethylene glycol of molecular weight 750 g/mol (Pluriol® 750, BASF SE Ludwigshafen, DE) were added dropwise such that the temperature of 80° C. was not exceeded. The mixture was subsequently stirred until the theoretical NCO value of 5.38% was reached. 3.01 g of N,N-dimethylbenzylamine were then added and the mixture was stirred for about 5 minutes until it was homogenized. 4.48 g of zinc octoate (Borchi® Kat 22 from Borchers GmbH, Langenfeld, DE) were then admixed and the mixture was stirred at 80° C. until the NCO content had fallen below 0.2% (about 16 hours). A colourless resin with a viscosity of 6,640 mPas (23° C.) was obtained. The product could be emulsified in water only with difficulty at a solids content of approx. 40% and separated again into two phases after a short time.

It is found that a higher NCO/OH ratio (which leads to a higher molecular weight) is necessary in order to arrive at stable emulsions.

The invention claimed is:

1. A process for preparing a water-emulsifiable, radiation-curing allophanate having residual monomer contents of less than 0.5 weight % and an NCO content of less than 1 weight %, comprising forming urethanes which contain NCO groups and have radiation-curing groups from
    A) at least one compound containing isocyanate groups,
    B) at least one hydroxy-functional compound which has groups which react, by polymerization, with ethylenically unsaturated compounds under the action of actinic radiation (radiation-curing groups),
    C) at least one polyoxyalkylene mono-ol,
    E) optionally in the presence of a catalyst, and subsequently reacting said urethanes which contain NCO groups and have radiation-curing groups, without further addition of compounds containing isocyanate groups, in the presence of
    F) an allophanation catalyst, and
    G) optionally a tertiary amine,
        wherein the ratio of NCO groups of the compounds from A) to the OH groups of the compounds from B) and C) is 1.80:1.0 to 1.46:1.0.

2. The process of claim 1, wherein at least one compound which differs from B) and/or C) and has NCO-reactive groups is employed as component D), wherein the ratio of NCO groups of the compounds from A) to the OH groups of the compounds from B), C) and D) is 1.80:1.0 to 1.46:1.0.

3. The process of claim 1, wherein hexamethylene-diisocyanate (HDI), isophorone-diisocyanate (IPDI), and/or 4,4'-diisocyanatodicyclohexylmethane are employed in component A).

4. The process of claim 1, wherein the ratio of NCO groups of the compounds from A) to the OH groups of the compounds from B), C) and D) is 1.7:1.0 to 1.47:1.0.

5. The process of claim 1, wherein the ratio of NCO groups of the compounds from A) to the OH groups of the compounds from B), C) and D) is 1.65:1.0 to 1.48:1.0.

6. The process of claim 1, wherein polyoxyalkylene monools which contain a content of from 30 to 100 weight % of units which are derived from ethylene oxide are employed in C).

7. The process of claim 1, wherein hydroxyethyl (meth) acrylate and/or hydroxypropyl (meth)acrylate are employed in component B).

8. The process of claim 1, wherein the allophanation is carried out until the end product has an NCO content of less than 0.1 weight %.

9. The process of claim 1, wherein component A) is employed in amounts of from 20 to 60 weight %, component B) in amounts of from 25 to 50 weight %, component C) in amounts of from 10 to 35 weight %, component D) in amounts of from 0 to 40 weight %, component E) in amounts of from 0 to 5 weight %, component F) in amounts of from 0.001 to 5 weight % and component G) in amounts of from 0 to 5 weight %, with the proviso that the sum of the weight % of components A) to G) is 100.

10. The process of claim 1, wherein the urethanation of components A) to D) is optionally carried out in the presence of E), according to determination of the NCO content an NCO value is reached which deviates from the theoretical % NCO content by up to 1.5 weight % NCO (absolute), and the allophanation is subsequently carried out by addition of component E) and optionally F), without further addition of compounds containing isocyanate groups.

* * * * *